US006922194B2

(12) United States Patent
Riffault

(10) Patent No.: US 6,922,194 B2
(45) Date of Patent: Jul. 26, 2005

(54) METHOD AND APPARATUS FOR MAINTAINING LOAD BALANCE ON A GRAPHICS BUS WHEN AN UPGRADE DEVICE IS INSTALLED

(75) Inventor: Patrick Louis-Rene Riffault, Nepean (CA)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/929,470

(22) Filed: Aug. 13, 2001

(65) Prior Publication Data

US 2002/0024523 A1 Feb. 28, 2002

Related U.S. Application Data

(63) Continuation of application No. 09/322,117, filed on May 27, 1999, now Pat. No. 6,275,240.

(51) Int. Cl.[7] ............................................. G06F 13/14
(52) U.S. Cl. ....................... 345/520; 345/503; 710/305; 326/30; 326/31; 326/87; 326/88
(58) Field of Search .............................. 326/30, 31, 87, 326/88; 345/520, 503; 710/305

(56) References Cited

U.S. PATENT DOCUMENTS

| 5,054,062 | A | * | 10/1991 | Molnar ........................ 379/402 |
| 5,264,744 | A | * | 11/1993 | Mizukami et al. ............. 326/62 |
| 5,613,130 | A | * | 3/1997 | Teng et al. ................... 713/300 |
| 5,799,204 | A | * | 8/1998 | Pesto, Jr. ...................... 710/10 |
| 5,884,053 | A | * | 3/1999 | Clouser et al. ............... 710/312 |
| 5,892,964 | A | * | 4/1999 | Horan et al. .................. 712/33 |
| 5,926,031 | A | * | 7/1999 | Wallace et al. ................ 326/30 |
| 6,029,216 | A | * | 2/2000 | Hoglund et al. ............. 710/100 |
| 6,070,211 | A | * | 5/2000 | Neal et al. ................... 710/106 |
| 6,141,021 | A | * | 10/2000 | Bickford et al. ............. 345/503 |
| 6,170,029 | B1 | * | 1/2001 | Kelley et al. ................ 710/302 |
| 6,549,963 | B1 | * | 4/2003 | Sayles ......................... 710/104 |

FOREIGN PATENT DOCUMENTS

| EP | 0 867 812 A1 | 9/1998 |
| WO | WO 19430 | 5/1998 |
| WO | WO 00/73891 A1 | 12/2000 |

OTHER PUBLICATIONS

International Search Report for PCT/US00/12851, 3 pages.
Intel Corporation, "Accelerated Graphics Port Interface Specification," Revision 2.0, XP–002123870, May 4, 1998, pp. 1–259.

* cited by examiner

Primary Examiner—Ulka J. Chauhan
(74) Attorney, Agent, or Firm—Blakely, Sokoloff, Taylor & Zafman LLP

(57) ABSTRACT

An embodiment of a graphics device that maintains load balance on a graphics bus when an upgrade graphics device is installed is disclosed. The embodiment includes load balancing buffers for the strobe compliment signals AD_STB0#, AD_STB1#, and SB_STB# on a 2X mode AGP graphics device. The load balancing buffers couple the 2X mode AGP graphics device to the strobe compliment signals AD_STB0#, AD_STB1#, and SB_STB#, but the load balancing buffers are not connected to any internal circuits within the 2X mode AGP graphics device. The load balancing buffers provide equal capacitive loading between the strobe signals AD_STB0 , AD_STB1 , and SB_STB and their compliment signals AD_STB0#, AD_STB1#, and SB_STB# when an upgrade 4X mode AGP graphics device is installed.

17 Claims, 4 Drawing Sheets

METHOD AND APPARATUS FOR MAINTAINING LOAD BALANCE ON A GRAPHICS BUS WHEN AN UPGRADE DEVICE IS INSTALLED

This application is a continuation of Ser. No. 09/322,117 filed May 27,1999 now U.S. Pat. No. 6,275,240.

FIELD OF THE INVENTION

The present invention pertains to the field of computer systems. More particularly, this invention pertains to the field of installing an upgrade graphics device in the presence of a previously installed graphics device.

BACKGROUND OF THE INVENTION

High performance graphics devices are becoming increasingly important in today's computer systems. Computer system manufacturers commonly install graphics accelerators on add-in cards that plug into connectors that provide connection to a graphics bus such as an accelerated graphics port (AGP) bus. Graphics accelerators are also commonly installed by soldering the component directly onto computer system motherboards. The add-in card method provides the computer system manufacturer and the end user a means for installing a newer model graphics accelerator. One can simply remove the old add-in card and install a new one. The add-in card method has a drawback in that the add-in card method is more expensive than the solder-down method. The add-in card also uses more space than a device soldered directly onto the motherboard.

The solder-down method provides a cost savings over the add-in card method, but has the disadvantage of not providing a method for upgrading the graphics accelerator. If a computer system manufacturer wishes to change to a different graphics accelerator, the computer system manufacturer must redesign the motherboard. Further, the AGP bus is meant to be a point-to-point interconnect between a system memory controller and a single graphics device, and prior computer systems that utilize an AGP bus are not able to provide an upgrade option when a graphics device is already soldered onto the motherboard.

An AGP graphics device may have the ability to operate in one or more of several data transfer modes, including 2X mode and 4X mode. The 2X mode allows the transfer of 8 bytes of data per clock cycle using a pair of data strobe signals. The 4X mode allows the transfer of 16 bytes per clock cycle using 2 pairs of data strobe signals.

A prior 2X mode AGP graphics device normally includes input/output buffers for two address/data strobe signals (AD_STB0 and AD_STB1) and an input buffer for a sideband strobe signal (SB_STB). An AGP bus that allows 4X mode operation provides compliments of the above strobe signals (AD_STB0#, AD_STB1#, and SB_STB#) in addition to the above strobe signals. When the prior 2X mode AGP graphics device is installed on the AGP bus capable of 4X mode operation, the strobe compliment signals in prior systems are not connected at the prior 2X mode AGP graphics device. If an upgrade 4X mode AGP graphics device is installed on the 4X mode capable AGP bus in parallel with the prior 2X mode AGP device, a situation is created where the AD_STB0, AD_STB1, and SB_STB signals have three capacitive loads (one at a memory controller, one at the prior 2X mode AGP graphics device, and one at the upgrade 4X mode AGP graphics device) and the AD_STB0#, AD_STB1#, and SB_STB# signals have two capacitive loads (one at the memory controller and one at the upgrade 4X mode AGP graphics device). This difference in capacitive loading between the strobe signals and their compliments would have a negative impact on graphics bus timing relationships, and therefor a negative impact on system reliability.

SUMMARY OF THE INVENTION

A graphics device for maintaining load balance on a graphics bus when an upgrade graphics device is installed is disclosed. The graphics device includes a bus interface unit including a plurality of bus signal buffers to couple the graphics device to a graphics bus. The graphics device further includes a load balancing bus signal buffer to further couple the graphics device to the graphics bus, the load balancing bus signal buffer to provide load balancing on the graphics bus when an upgrade graphics device is installed.

BRIEF DESCRIPTION OF THE DRAWINGS

The invention is illustrated by way of example and not limitation in the figures of the accompanying drawings, in which like references indicate similar elements, and in which.

DETAILED DESCRIPTION

One embodiment of a graphics device that maintains load balance on a graphics bus when an upgrade graphics device is installed is disclosed. The embodiment includes load balancing buffers for the strobe compliment signals AD_STB0#, AD_STB1#, and SB_STB# on a 2X mode AGP graphics device. The load balancing buffers couple the 2X mode AGP graphics device to the strobe compliment signals AD_STB0#, AD_STB1#, and SB_STB#, but the load balancing buffers are not connected to any internal circuits within the 2X mode AGP graphics device. The load balancing buffers provide equal capacitive loading between the strobe signals AD_STB0, AD_STB1, and SB_STB and their compliment signals AD_STB0#, AD_STB1#, and SB_STB# when an upgrade 4X mode AGP graphics device is installed. Although specific signal names are used in describing the various embodiments, other signal names are possible.

An embodiment of a graphics device that can be disabled when an upgrade graphics device is installed is also disclosed. The graphics device includes an interface to a bus and an input to receive a device disable signal. When the device disable signal is asserted, the interface to the bus places its buffers in a high impedance state. As a result, the graphics device is effectively electrically isolated from the bus. When the device disable signal transitions from asserted to deasserted, a reset circuit in the graphics device resets the graphics device.

Figure 1:
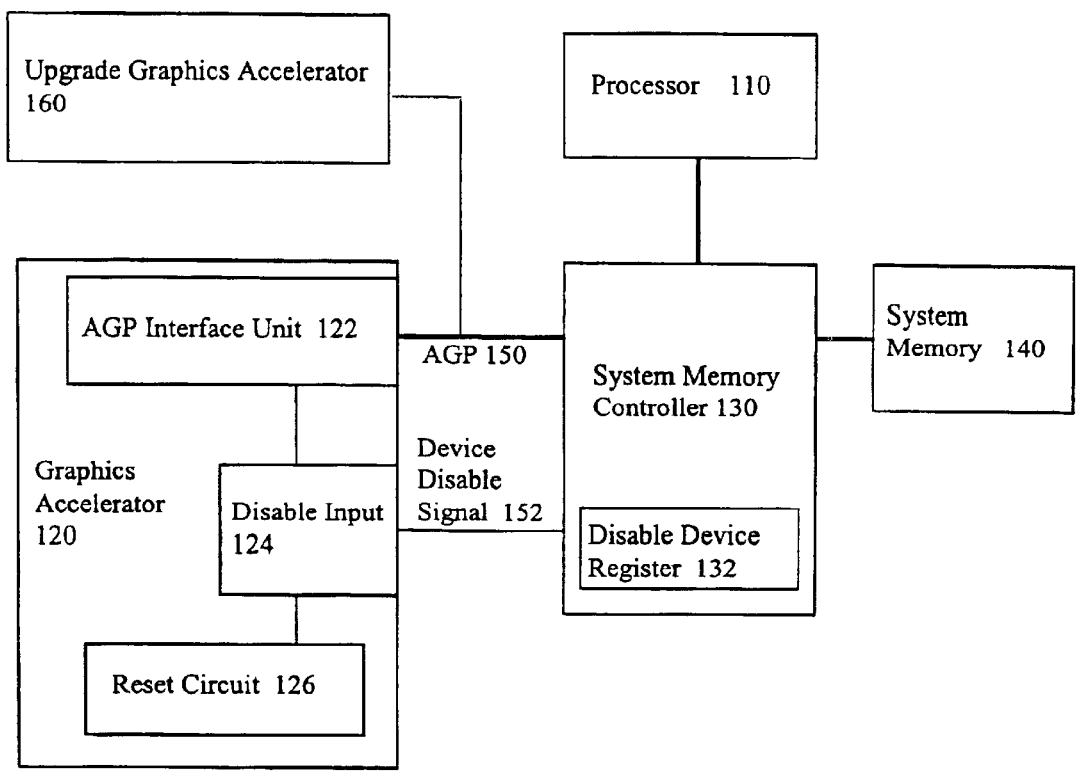
FIG. 1 shows a block diagram of one embodiment of a system that disables a graphics device when an upgrade graphics device is installed.

FIG. 1 shows a block diagram of one embodiment of a system 100 that allows the installation of an upgrade graphics device when a graphics device is already installed. The system 100 includes a processor 110, a system memory controller 130, a system memory 140, a graphics accelerator 120, and an optional upgrade graphics accelerator 160. The system memory controller 130 includes a disable device register 132 whose value determines whether a device disable signal 152 is to be asserted or deasserted by the system memory controller 130. The device disable register 132 may be a single bit in a larger register. The graphics accelerator 120 includes a reset circuit 126, a disable input 124, and an AGP interface unit 122. The AGP interface unit 122 is coupled to an AGP bus 150. The AGP interface unit 122 includes buffers that provide electrical connection to the AGP bus 150. The disable input 124 receives the device disable signal 152 from the system memory controller 130.

The optional upgrade graphics accelerator 160 may be coupled to the AGP bus 150 through an add-in card connector. Thus, the upgrade graphics accelerator 160 may be installed or removed as the computer system manufacturer or end user desire. It is contemplated that a computer system manufacturer may initially manufacture a computer system with the graphics accelerator 120 soldered onto a motherboard and would provide an add-in card connector that can accommodate an upgrade graphics device.

When the system 100 is first powered up, or upon a reset of system 100, the disable device register 132 may initially contain a value that indicates that the disable device signal 152 is to be asserted. When the disable device signal 152 is asserted, the AGP interface unit 122 causes all of its buffers that connect to the AGP bus to enter a high impedance state. The term "high impedance state" as used herein includes any state where the buffers neither drive nor sink substantial current to or from the AGP bus 150. The graphics accelerator 120 may also enter a low-power state when the disable input receives an asserted device disable signal 152.

After power up or upon a system reset, configuration software is executed to determine whether the upgrade graphics accelerator 160 is installed. If the configuration software determines that the upgrade processor is installed, then the disable device register 132 maintains a value that indicates that the device disable signal is to be asserted. If the configuration software determines that the upgrade graphics accelerator 160 is not installed, then a value is written to the disable device register 132 that indicates that the device disable signal 152 should be deasserted. When the disable device register 132 contains a value that indicates that the device disable signal 152 should be deasserted, the system memory controller 130 deasserts the device disable signal 152.

When the device disable signal 152 transitions from asserted to deasserted, the reset circuit 126 resets the graphics accelerator 120 in order to prepare the graphics accelerator 120 for operation.

Although the above discussion in connection with FIG. 1 mentions the use of an AGP bus and a graphics accelerator, other embodiments may include other bus types as well as other types of peripheral devices. Further, other embodiments may include hardware circuitry for determining whether the upgrade graphics accelerator 160 is installed, rather than, or in addition to, the configuration software.

Figure 2:
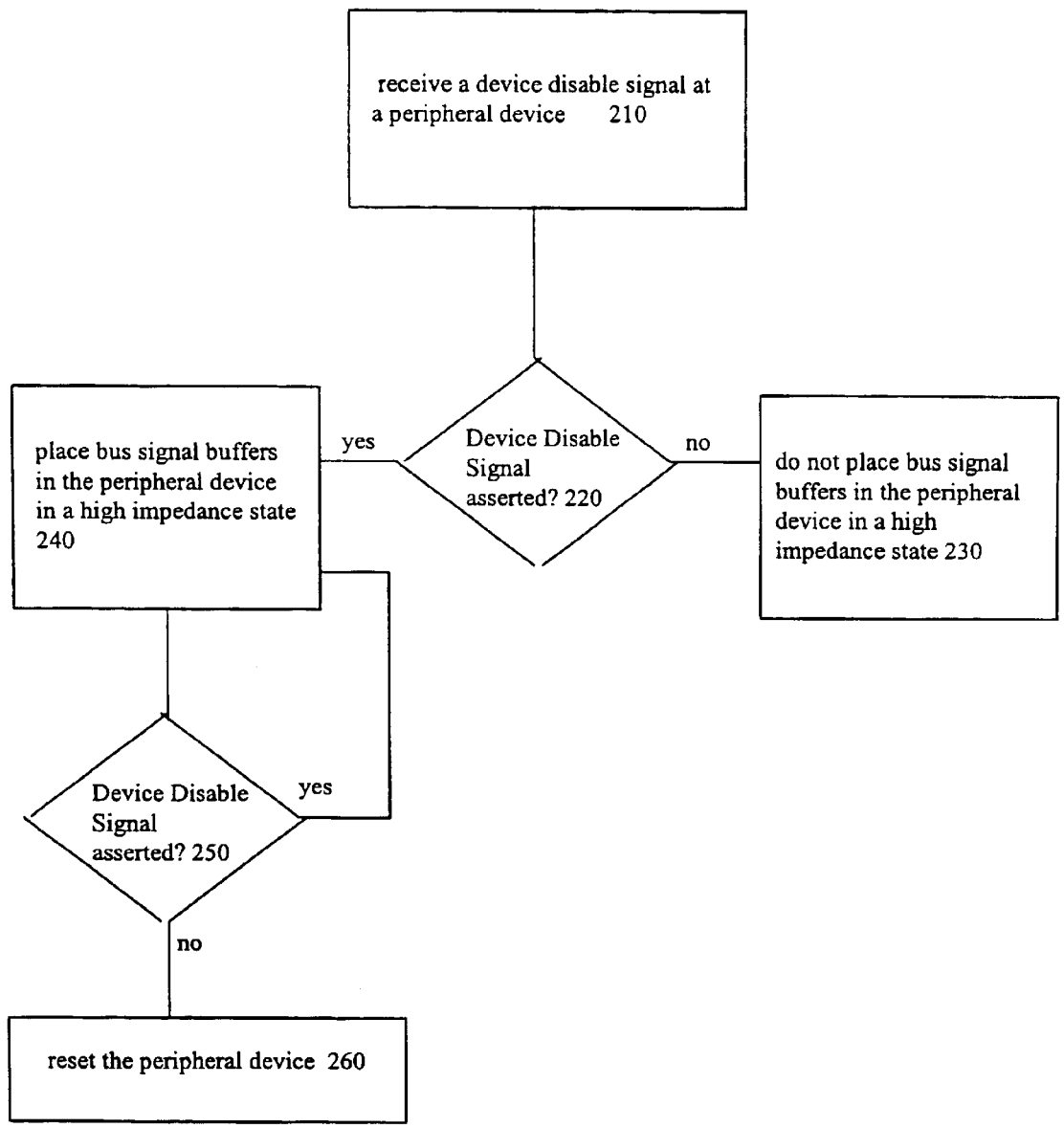
FIG. 2 is one embodiment of a method to disable a peripheral device when an upgrade device is installed.

FIG. 2 is a flow diagram of one embodiment of a method to disable a peripheral device when an upgrade device is installed. At step 210 a device disable signal is received at a peripheral device. If the device disable signal is not asserted at step 220, the bus signal buffers in the peripheral device are not placed in a high impedance state at step 230. If the device disable signal is asserted at step 220, the bus signal buffers in the peripheral device are placed in a high impedance state at step 240. Following step 240, if the device disable signal thereafter transitions from asserted to deasserted at step 250, the peripheral device is reset at step 260.

Figure 3:
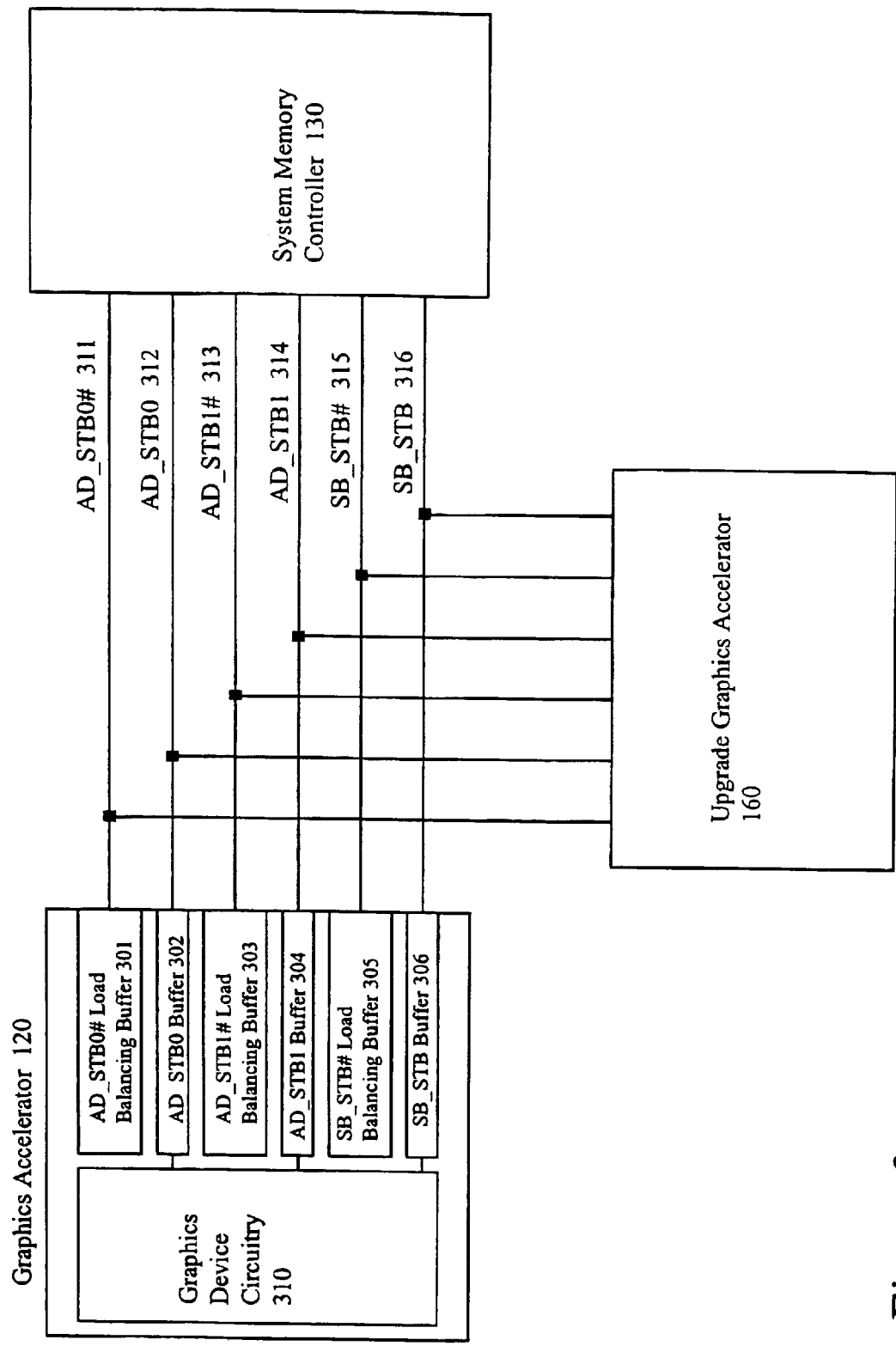
FIG. 3 is a block diagram of one embodiment of a system including a graphics device that maintains load balance on a graphics bus when an upgrade graphics device is installed.

FIG. 3 is a block diagram of one embodiment of a system including a graphics accelerator 120 that maintains load balance on a graphics bus when an upgrade graphics accelerator 160 is installed. The graphics accelerator 120 may be a 2X mode AGP graphics device and the upgrade graphics accelerator 160 may be a 4X mode AGP device. In one embodiment, a system memory controller 130 is coupled to the graphics accelerator 120 and to the upgrade graphics accelerator 160 via an AGP bus capable of 4X mode operation. A subset of a 4X mode AGP bus is shown in FIG. 3 and includes strobe signals AD_STB0 312, AD_STB1 314, and SB_STB 316 and their compliments AD_STB0#311, AD_STB1#313, and SB_STB#315. Although specific signal names are used in describing the various embodiments, other signal names are possible.

In one embodiment, the upgrade graphics accelerator 160 makes use of each of the strobe signals 311–316 when communicating with the system memory controller 130 in 4X mode. The graphics accelerator 120 receives each of the strobe signals 311–316, but uses only the AD_STB0 312, AD_STB1 314, and SB_STB 316 strobe signals in its graphics device circuitry 310. In order to equalize capacitive loading between the strobe signals 312, 314, and 316 and their compliment signals 311, 313, and 315, the graphics accelerator 120 provides load balancing buffers 301, 303, and 305. In one embodiment, the load balancing buffers 301 and 303 are identical to AD_STB0 buffer 302 and AD_STB1 buffer 304. The SB_STB# load balancing buffer 305 may be identical to SB_STB buffer 306.

Figure 4:
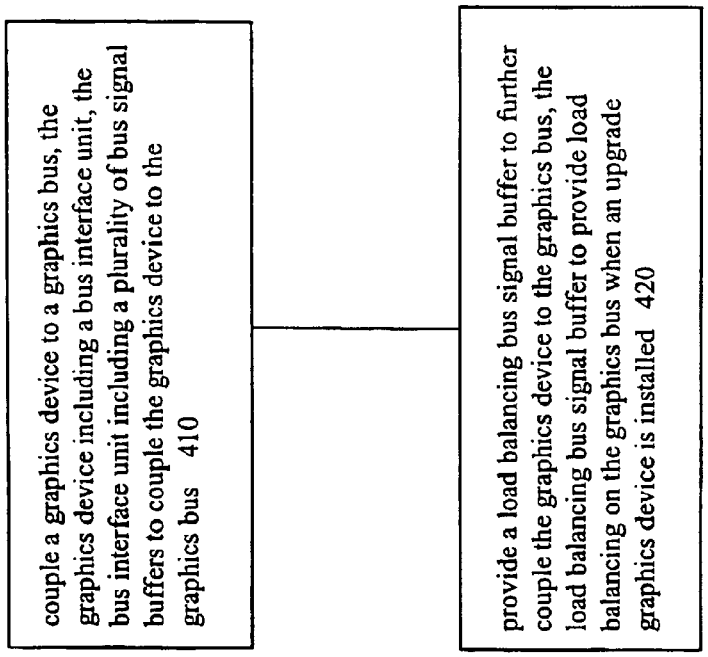
FIG. 4 is one embodiment of a method for maintaining load balance on a graphics bus when an upgrade graphics device is installed.

FIG. 4 is one embodiment of a method for maintaining load balance on a graphics bus when an upgrade graphics device is installed. At step 410, a graphics device is coupled to a graphics bus. The graphics device includes a bus interface unit including a plurality of bus signal buffers to couple the graphics device to the graphics bus. At step 420, a load balancing bus signal buffer is provided to further couple the graphics device to the graphics bus. The load balancing bus signal buffer provides load balancing on the graphics bus when an upgrade graphics device is installed.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A graphics device, comprising:
   a bus interface unit including a plurality of bus signal buffers to couple the graphics device to a graphics bus, the bus signal buffers to receive a first set of signals to be used by the graphics device; and
   a load balancing bus signal buffer to further couple the graphics device to the graphics bus, the load balancing bus signal buffer to receive a second set of signals not to be used by the graphics device, the load balancing bus signal buffer to provide load balancing on the graphics bus when a second graphics device is installed, the load balancing bus signal buffer is not connected to any internal circuits of the graphics device.

2. The graphics device of claim 1, wherein the graphics bus is an accelerated graphics port (AGP) bus.

3. The graphics device of claim 2, wherein the graphics device is an AGP 2X device.

4. The graphics device of claim 3, wherein the upgrade graphics device is an AGP 4X device.

5. The graphics device of claim 4, the load balancing bus signal buffer to provide load balancing for a first address/data bus strobe compliment signal on the AGP bus.

6. The graphics device of claim 4, the load balancing bus signal buffer to provide load balancing for a second address/data bus strobe compliment signal on the AGP bus.

7. The graphics device of claim 4, the load balancing bus signal buffer to provide load balancing for a sideband strobe compliment signal on the AGP bus.

8. An apparatus, comprising:

a graphics bus;

a graphics device coupled to the graphics bus, the graphics device including
- a bus interface unit including a plurality of bus signal buffers to couple the graphics device to the graphics bus, the bus signal buffers to receive a first set of signals to be used by the graphics device;
- a load balancing bus signal buffer to further couple the graphics device to the graphics bus, the load balancing bus signal buffer to receive a second set of signals not to be used by the graphics device, the load balancing bus signal buffer to provide load balancing on the graphics bus when a second graphics device is installed, the load balancing bus signal buffer is not connected to any internal circuits of the graphics device; and a second graphics device connector to receive a second graphics device, the second graphics device connector to couple the second graphics device to the graphics bus.

9. The apparatus of claim 8, wherein the graphics bus is an accelerated graphics port (AGP) bus.

10. The apparatus of claim 9, wherein the graphics device is an AGP 2X device.

11. The apparatus of claim 10, the upgrade graphics device connector to receive an AGP 4X device.

12. The apparatus of claim 11, the load balancing bus signal buffer to provide load balancing for a first address/data bus strobe compliment signal on the AGP bus.

13. The apparatus of claim 11, the load balancing bus signal buffer to provide load balancing for a second address/data bus strobe compliment signal on the AGP bus.

14. The apparatus of claim 11, the load balancing bus signal buffer to provide load balancing for a sideband strobe compliment signal on the AGP bus.

15. A method, comprising:

coupling a graphics device to a graphics bus, the graphics device including a plurality of bus signal buffers to couple the graphics device to the graphics bus, the bus signal buffers to receive a first set of signals to be used by the graphics device; and providing a load balancing bus signal buffer to further couple the graphics device to the graphics bus, the load balancing bus signal buffer to receive a second set of signals not to be used by the graphics device, the load balancing bus signal buffer to provide load balancing on the graphics bus when an upgrade graphics device is installed, the load balancing bus signal buffer is not connected to any internal circuits of the graphics device.

16. The method of claim 15 wherein providing a load balancing bus signal buffer includes the step of providing a load balancing bus signal buffer for an address/data bus strobe compliment signal on an accelerated graphics port (AGP) bus.

17. The method of claim 15, wherein providing a load balancing bus signal buffer includes the step of providing a load balancing bus signal buffer for a sideband strobe compliment signal on an AGP bus.

* * * * *